US012743511B2

(12) United States Patent
Kahn et al.

(10) Patent No.: US 12,743,511 B2
(45) Date of Patent: Sep. 22, 2026

(54) RANSOMWARE MITIGATION DEVICE AND METHOD

(71) Applicant: ARRIS Enterprises LLC, Suwanee, GA (US)

(72) Inventors: Michael R. Kahn, Cherry Hill, NJ (US); Christopher Poli, Doylestown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 526 days.

(21) Appl. No.: 17/723,148

(22) Filed: Apr. 18, 2022

(65) Prior Publication Data

US 2022/0350887 A1 Nov. 3, 2022

Related U.S. Application Data

(60) Provisional application No. 63/181,864, filed on Apr. 29, 2021.

(51) Int. Cl.
*G06F 21/56* (2013.01)

(52) U.S. Cl.
CPC .......... *G06F 21/564* (2013.01); *G06F 21/561* (2013.01); *G06F 21/568* (2013.01); *G06F 2221/034* (2013.01)

(58) Field of Classification Search
USPC ........................................................... 380/28
See application file for complete search history.

(56) References Cited

U.S. PATENT DOCUMENTS

2017/0364681 A1* 12/2017 Roguine ............... G06F 21/554
2020/0404019 A1* 12/2020 Drake ................... H04L 9/3226
2021/0042410 A1* 2/2021 Gehtman .............. H03M 7/702
2021/0224379 A1* 7/2021 Pientka ............... G06F 11/1464
2021/0357504 A1* 11/2021 Saad ..................... G06F 21/567

FOREIGN PATENT DOCUMENTS

AU 2012347866 A1 * 7/2014 .......... G06F 11/1453
JP 2004514963 A * 5/2004 .......... G06F 11/1466

* cited by examiner

*Primary Examiner* — Sakinah White-Taylor
(74) *Attorney, Agent, or Firm* — Chernoff, Vilhauer, McClung & Stenzel, LLP

(57) ABSTRACT

A system and method for backing up data is disclosed. In one embodiment, the method includes receiving N data segments, the N of data segments together defining first backup data read from a processing device, receiving L data segments, the L data segments together defining second backup data read from the processing device temporally subsequent to the reading of the N data segments, determining if the L data segments comprise ransomware, preventing overwriting of the stored N data segments if the L data segments comprise ransomware, and storing the received L data segments if the L data segments do not comprise ransomware.

14 Claims, 7 Drawing Sheets

RANSOMWARE MITIGATION DEVICE AND METHOD

BACKGROUND

1. Field

The present disclosure relates to systems and methods for storing data and in particular, for securely backing up data.

2. Description of the Related Art

Ransomware is a type of malicious software that blocks access to the victim's data and threatens to publish or delete it until a ransom is paid. More advanced malware uses a technique called cryptoviral extortion, in which it encrypts the victim's files, making them inaccessible, and demands a ransom payment to decrypt them. Recovering the files without the decryption key is an intractable problem—and difficult to trace digital currencies such as Ukash and Bitcoin are used for the ransoms, making tracing and prosecuting the perpetrators difficult.

Despite best practices, there is still a risk for a ransomware attack. One way to mitigate the risk is frequent backups of data. However, in some cases, the ransomware virus can also infect backups on connected or cloud storage devices. It is therefore desirable to have improvements in protecting backup data from insidious ransomware attacks.

SUMMARY

To address the requirements described above, this document discloses a system and method for backing up data. In one embodiment, the method comprises receiving N data segments, the N of data segments together defining first backup data read from a processing device, receiving L data segments, the L data segments together defining second backup data read from the processing device temporally subsequent to the reading of the N data segments, determining if the L data segments comprise ransomware, preventing overwriting of the stored N data segments if the L data segments comprise ransomware, and storing the received L data segments if the L data segments do not comprise ransomware.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The disclosed solution involves a combination of hardware and software as part of a network attached storage (NAS) solution. In one embodiment, a computing device is used that is dedicated to making backups to multiple storage devices devices (e.g. hard disc drives). Each storage device has a corresponding electromechanical disconnect switch. After each backup is complete, the storage device is automatically electrically disconnected from the network by a resettable relay that requires mechanical intervention to restore. In this way, each backup is automatically made inaccessible from the network once complete, until reconnected by local operator intervention. Since the electrical disconnection makes it impossible to programmably access the storage device to write over or modify the backed up information, the chance of losing contents and all backups due to a malicious ransomware attack is greatly reduced.

The user sets up a backup schedule (e.g. daily, weekly, etc.) and decides what files to back up from which devices, etc. After a backup is complete, the electromechanical disconnect is activated, disconnecting that backup from the network, and protecting it from corruption by ransomware. When appropriate, The user resets the electromechanical disconnect to reuse the drive for another backup session.

In another embodiment, previously stored backup data is compared to newly acquired backup data to determine if the newly acquired backup data includes malware or encrypted ransomware. This is detected by comparing corresponding units of storage of the backup data to determine if any changes in have been made to the data. If a threshold number of storage units have been changed between backup data instances, there is a high probability that the newly acquired backup data is compromised. Upon this determination, the previous backup data can be protected (e.g. via write protection or by physically disconnecting the storage devices) and/or the prevention of writing the newly acquired backup data.

Figure 1:
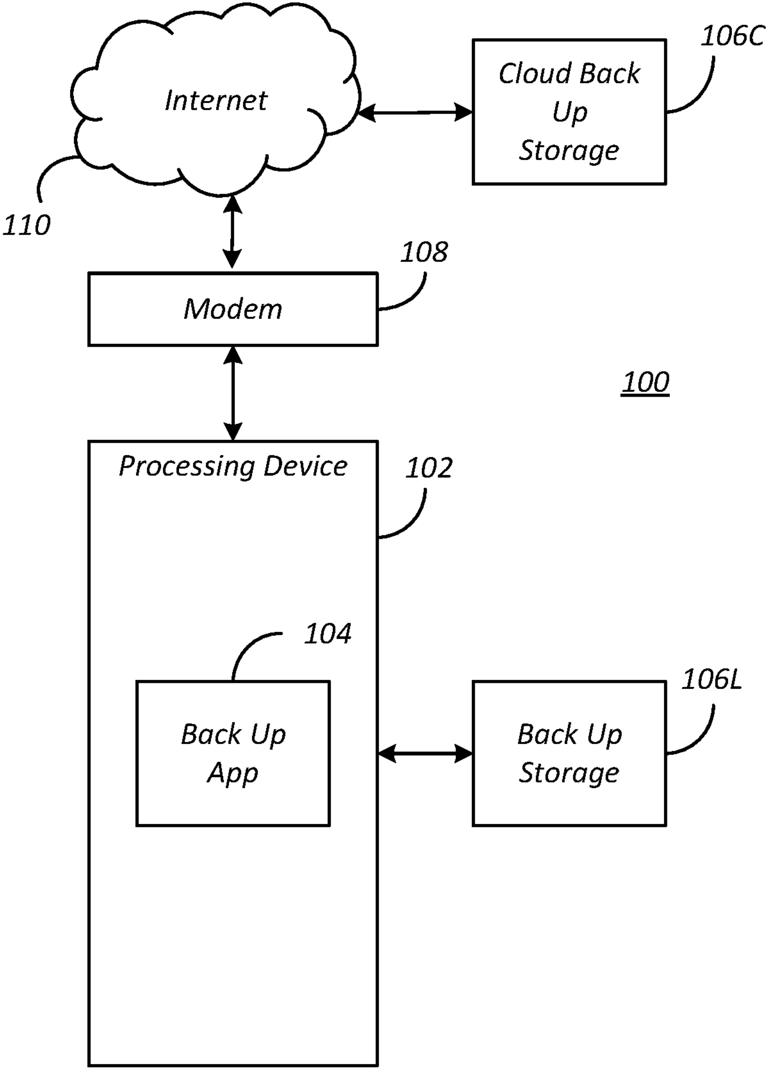
FIG. 1 is a diagram illustrating one embodiment of a computer system.

FIG. 1 is a diagram illustrating one embodiment of a computer system 100. The computer system 100 comprises a processing device 102, which is communicatively coupled to the Internet 110 via a modem 108 or similar device. As described above, it is known that to prevent loss of data, it is beneficial to occasionally back up the data stored on the computer to 102 to back up storage 106, which may comprise local backup storage 106L or cloud-based backup storage 106C. Typically, the backing up of data stored on the processing device 102 is controlled by an backup application 104 executing on the computer. When first executed, the backup application 104 typically copies all or selected files stored on the processing device 102 to the backup storage 106. Thereafter, when commanded to perform a backup the backup application 104 identifies which files stored on the processing device 102 have been modified since the most recent backup, and copies the latest versions of these files to backup storage, overwriting previous backups (for example, by use of an XCOPY command or equivalent).

As described above, liberal backing up of data of the processing device 102 can be an effective means to counter a ransomware attack, as it allows the user to simply put the processing device 102 back to the state in which the processing device 102 existed before the ransomware attack occurred. Unfortunately, backup storage 106 is not itself immune from a ransomware attack, and previous copies of clean data may be overwritten by encrypted ransomware files.

Figure 2:
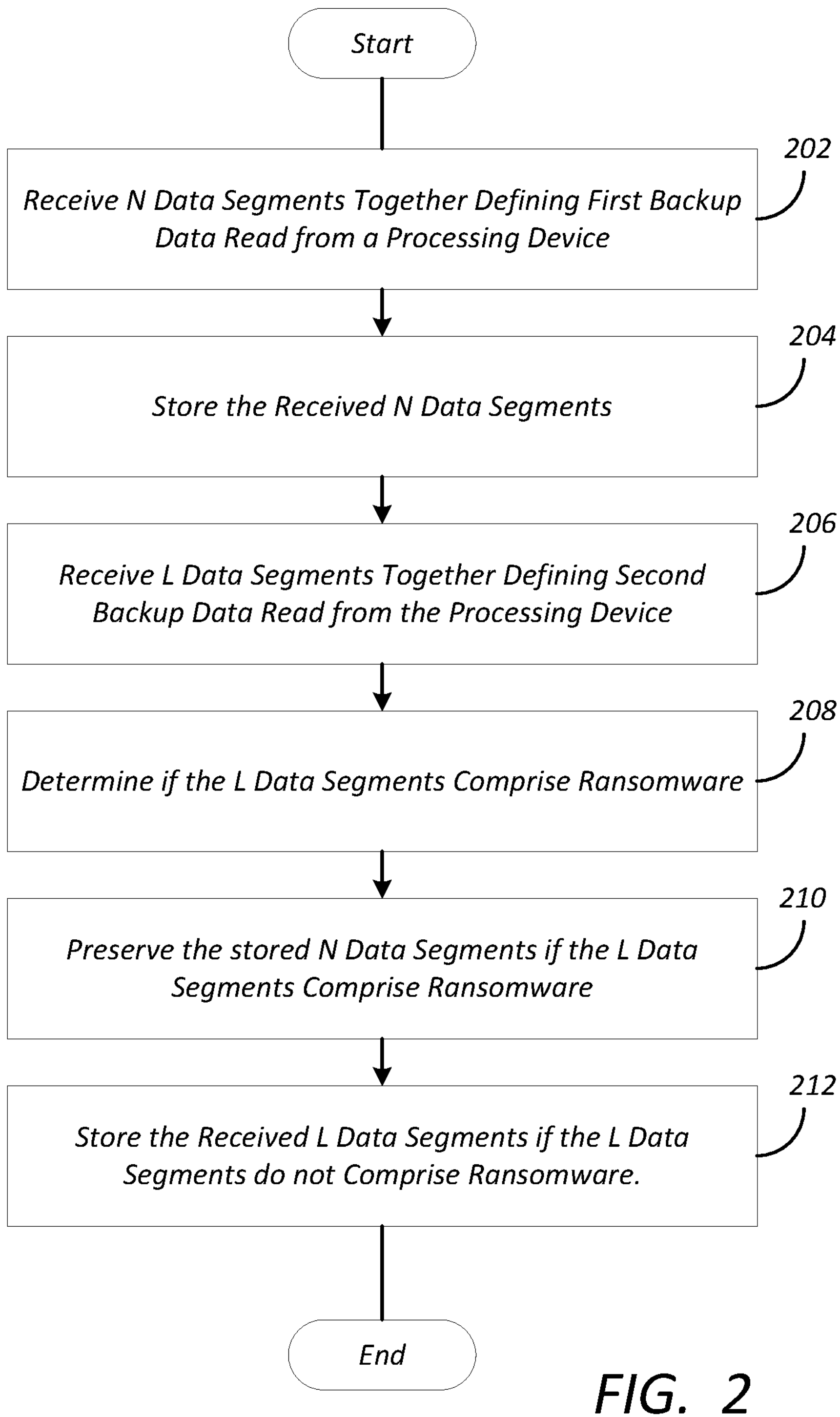
FIG. 2 is a diagram presenting illustrative method steps that can be used to back up data from a processing device such as the processing device.

FIG. 2 is a diagram presenting illustrative method steps that can be used to back up data from a processing device such as the processing device 102. In block 202, first backup data is received from the processing device. The first backup data is comprised of N data segments. In this context, a data segment can be defined as a collection of data in an addressable form, including for example, a data file or a hard disc sector.

In block 204, the received N data segments are stored, thus creating a back up of the received N data segments. In block 206 second backup data is received from the processing device. This second backup data is obtained from the processing at a time subsequent to the time when the first backup data was taken, and therefore represents more recent backup data. The second backup data comprises L data segments, and the second backup data may comprise either fewer data segments than the first backup data (L<N), more data segments than the first backup data (L>N), or the same number of data segments as the first backup data (L=N).

In block 208, a determination is made as to whether the L data segments comprise ransomware. In block 210, the N stored data segments are preserved if the L data segments comprise ransomware, and in block 212, the L data segments are stored if the L data segments do not comprise ransomware. Different embodiments of how the operations of blocks 208-212 are accomplished are discussed below.

First Embodiment

In a first embodiment, the N data segments are stored in a first storage device and the overwriting of the N stored plurality of data segments is prevented by communicatively isolating the first storage device before receiving the second received backup data.

Figure 3:
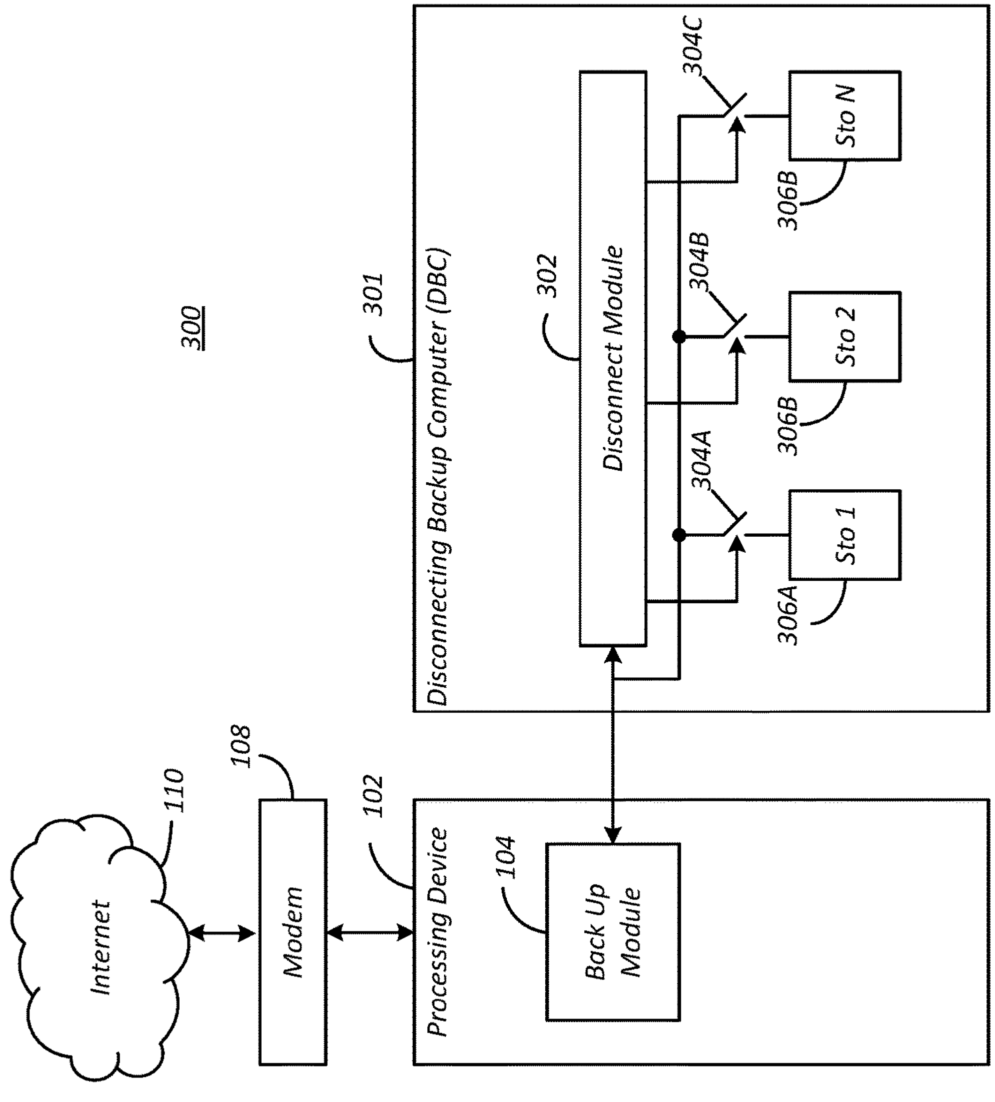
FIG. 3 is a diagram illustrating an implementation of the first embodiment of a data backup system.

FIG. 3 is a diagram illustrating an implementation of the first embodiment of a data backup system 300. In this embodiment, a disconnecting backup computer (DBC) 301 is communicatively coupled to the processing device 102. The DBC 301 comprises or is communicatively coupled to a plurality of storage devices 306A-306N, which may be removable. Each storage device 306A-306N has an input that is coupled to a switch 304A-304C that is controlled by the disconnect module 302. Nominally, the switches 304 are closed, but when activated by the disconnect module 302, the switch is open, thus disconnecting and communicatively isolating the respective storage device 306 from other elements of the system 300. Although depicted as a separate device, the disconnecting backup computer may comprise a network attached storage device integrated with the processing device 102 or the modem 108.

Initially, switches 304 are all closed, allowing the first backup data from the processing device 102 to be stored in any of the storage devices 306. For purposes of illustration, we assume that the N data segments received from the processing device 102 are stored in the first storage device 306A. Before the second backup data is received (and preferably immediately after the first backup data is stored in the first storage device 306A), the disconnect module 302 activates switch 304A, communicatively isolating the first storage device from the other elements of the system 300. This electromechanical disconnect cannot be programmably altered to reconnect the first storage device 306A to the system 300. Hence, no matter how compromised the processing device 102 or DBC 301 with viruses or malware, the first storage device 306A will remain isolated and the data stored therein (the N data segments) will remain unaltered until manually reset by a user of the system 300.

At some time after the first backup data is stored in the first storage device, the L data segments of the second backup data is read from the processing device 102, as shown in block 206. This may occur automatically on a periodic basis (e.g. daily) or in response to a user command. Since the disconnecting module 302 has irreversibly disconnected the first storage device 306A and the user has not manually reset switch 304A, the second backup data cannot be stored in the first storage device 306A, and cannot overwrite the N data segments currently stored on that drive.

At this point, the L data segments of the second backup data can be examined to determine whether they contain ransomware (as further described below), and only stored on a remaining storage device (e.g. 306B or 306N) if ransomware is not included. Or, the L data segments of the second backup data may simply be stored on one of the remaining storage devices, for example, storage device 306B, leaving the N data segments stored on the first storage device 306A untouched. After such storage, the disconnect module 302 uses switch 304B to communicatively isolate storage device 306B, thus at the same time preserving the second backup data from corruption, and preventing the second backup data from being used to infect other elements of the system 300. Such communicative isolation may be obtained, for example, by disconnecting the input to the storage device 306 or removing power from the device.

After such storage has occurred, a determination may be made that the L data segments of the second backup data included ransomware (for example, because a message or other artifice has been provided to the user of the processing device 102 that a ransomware attack has occurred). The first backup data stored in the first storage device 306A may then be used to restore the processing device 102, and the second backup data stored in the second storage device 306B discarded. Multiple storage devices 306 can be used thusly in a round-robin fashion, with each storage device 306 accounting for one of a temporal series of backups. When ransomware is detected, the storage device 306 having the latest backup data free of ransomware can be used to restore the files on the processing device 102.

Second Embodiment

In a second embodiment, the N data segments of the first backup data are stored in a first storage device and the overwriting of the N stored plurality of data segments is prevented by comparing the first backup data and the second backup data to detect if ransomware is included in the second backup data, and preventing the storage of the second backup data in a way that overwrites, erases, or compromises the first backup data.

Figure 4:
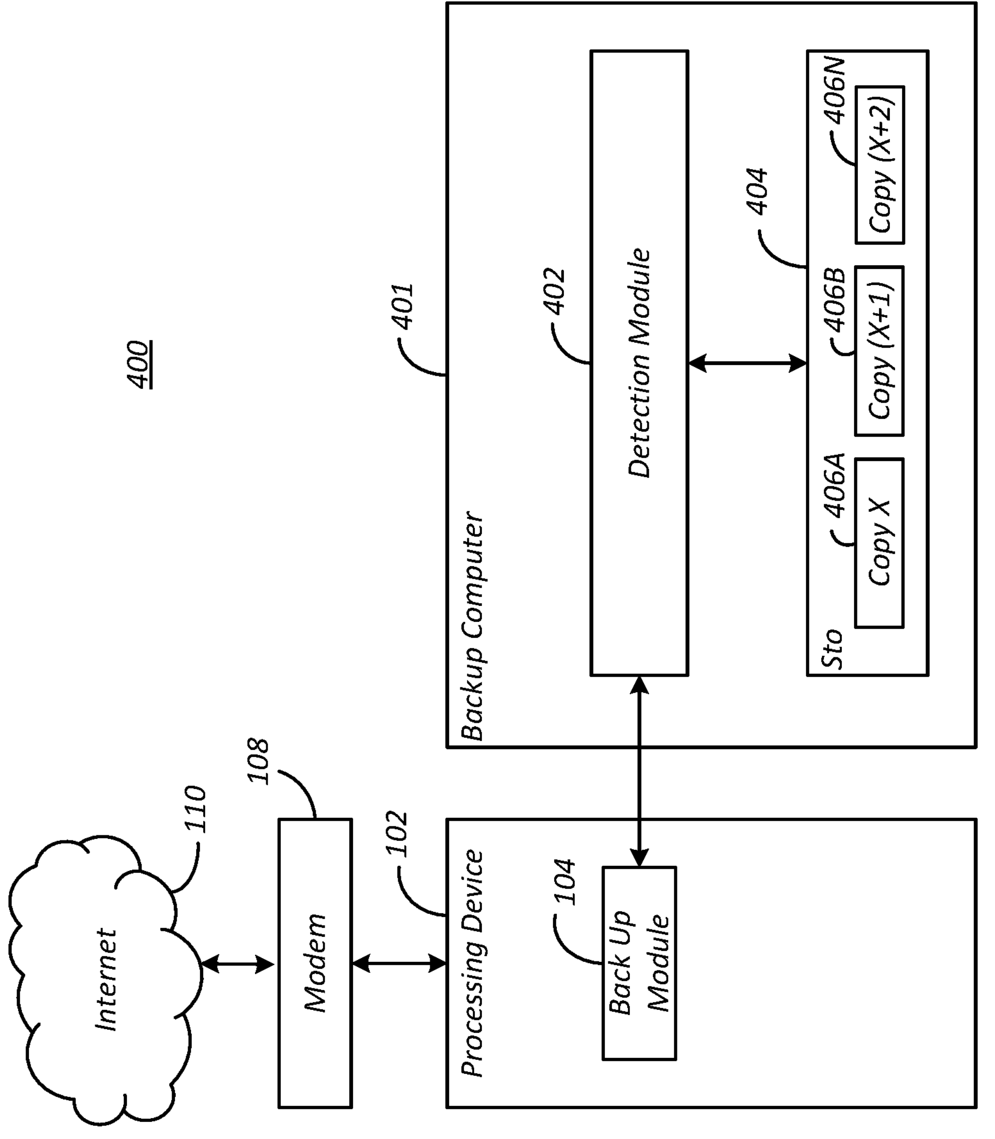
FIG. 4 is a diagram illustrating an implementation of a second embodiment of a data backup system.

FIG. 4 is a diagram illustrating an implementation of a second embodiment of a data backup system 300. In this embodiment, a backup computer (DBC) 401 is communicatively coupled to the processing device 102. The DBC 401 comprises a ransomware detection module communicatively coupled between the processing device 102 and one or more storage devices 404. FIG. 4 will be discussed with reference to FIG. 5, which presents operations in addition to those presented in FIG. 2 to implement the second embodiment.

Referring again to FIG. 2, block 202 receives N data segments that together define first backup data read from the processing device or processing device 102. These N data segments are then stored, as shown in block 204. This stored first backup data is illustrated in FIG. 4 as Copy X of the backup data 406A stored in storage device 404.

Figure 5:
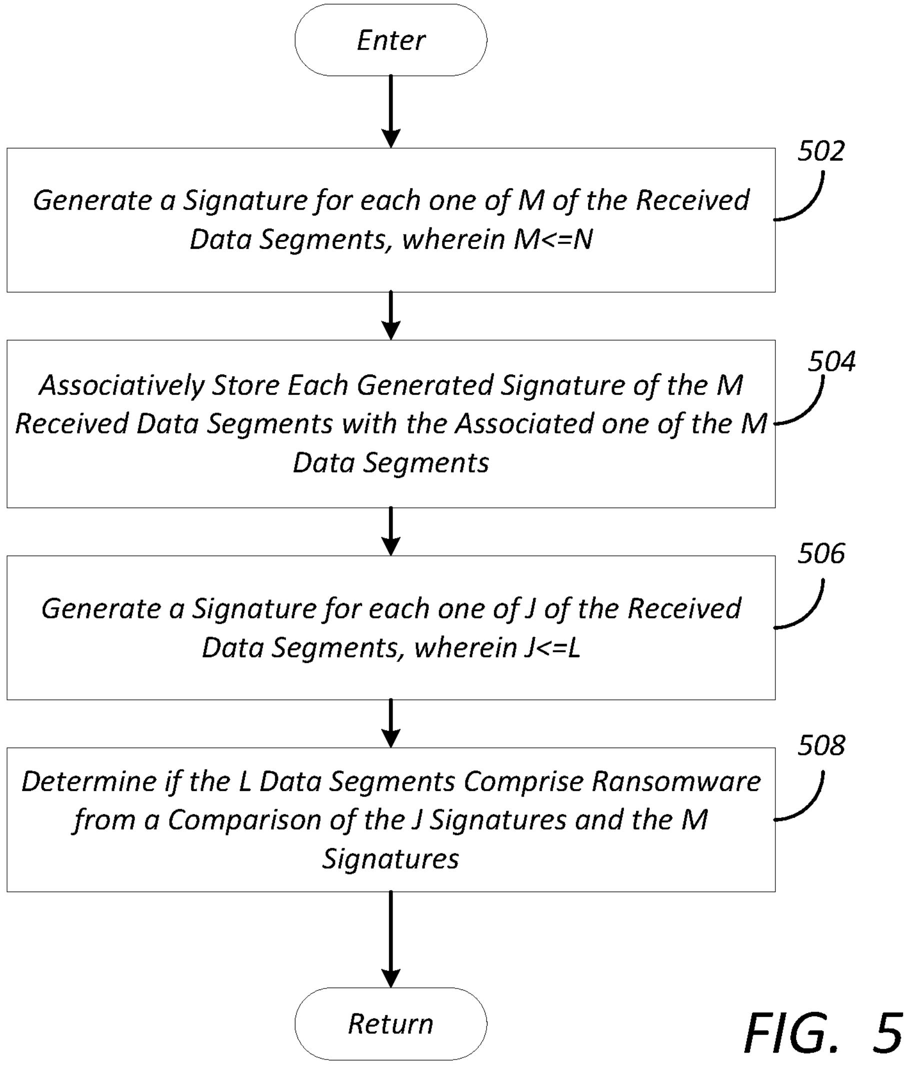
FIG. 5 is a diagram presenting operations in addition to those presented in FIG. 2 to implement the second embodiment.

Referring now to FIG. 5, a signature is generated for at least a subset M of the N data segments as shown in block 502. The signature allows the content of a data segment of first backup data to be compared to the content of a corresponding data segment of subsequent backup data from the same device. In one embodiment, the signature is a hash of the data segment. Since any changes to the content of the data segment will be reflected in a different hash, changes in the contents of the data segment can thus be identified from the hash. The signatures may be generated a detection module 402 of the backup computer 401, as illustrated in FIG. 4

Referring again to FIG. 5, in block 504, each generated signature of the M received data segment is stored in storage device 404 or in alternative storage communicatively coupled to the backup computer 401. These signatures are associatively stored with the M data segments so that the signature for any desired segment of the M data segments can be retrieved and compared to a signature generated for subsequent backup versions of the same data segment. For example, if the data is segmented according to files, that are stored according to filenames, the signatures of each respective segment may also be stored according to filename.

Referring back to FIG. 2, second backup data comprising L data segments are received from the processing device 102, as shown in block 206, and block 208 determines whether the L data segments comprise ransomware. In this embodiment, this is determined by generating a signature for each one of at least a subset (M in number) of the received L data segments, as shown in block 506, and comparing these generated signatures with the previously generated associated signatures of the at least a subset (J in number) of the J data segments. For example, a number of the differences between the J signatures and the M signatures can be determined and compared to a threshold number of differences, and if the number of differences exceed the threshold, it is determined that enough changes have been made between the first backup data and the second backup data to merit a conclusion that the processing device 102 sending the backup data has been compromised with ransomware.

Figure 6:
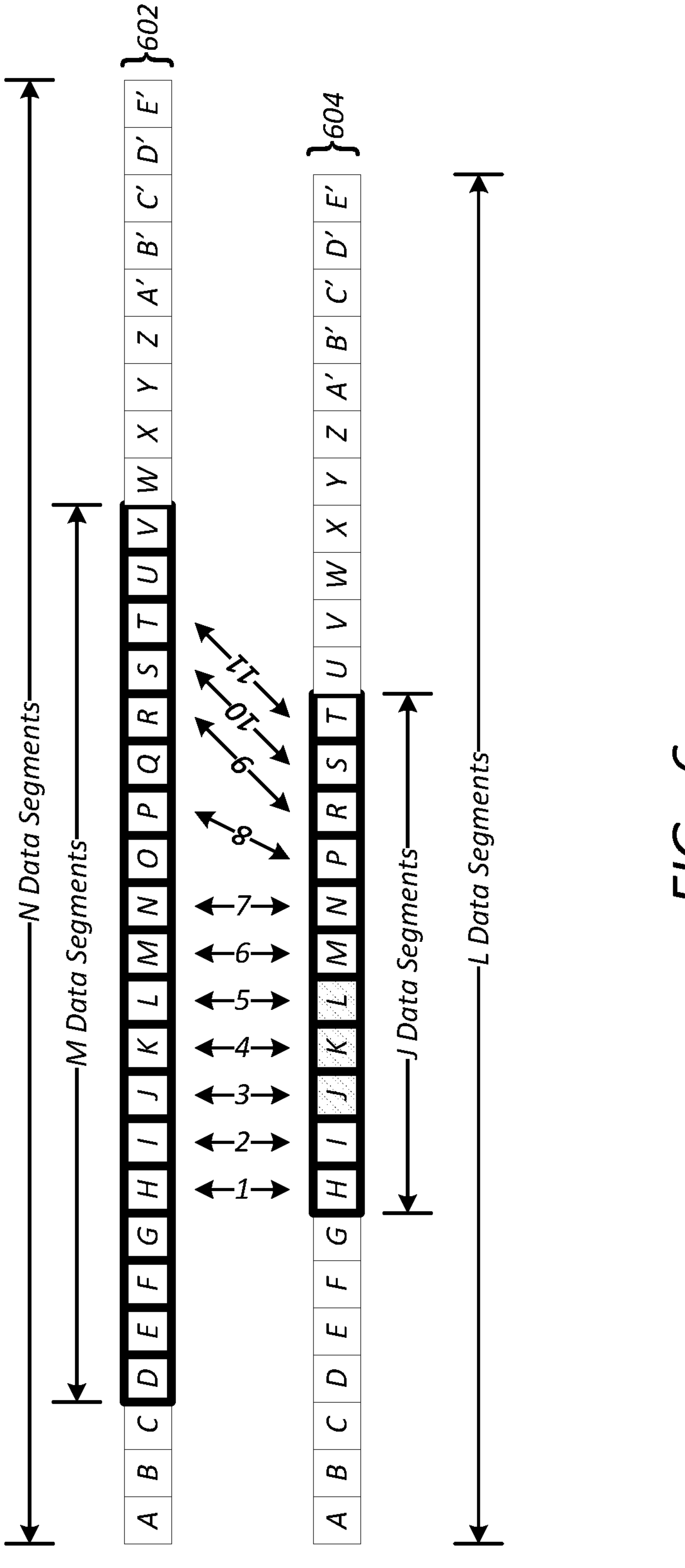
FIG. 6 is a diagram illustrating an example illustrating the operations of blocks 502-508 of FIG. 5.

FIG. 6 is a diagram illustrating an example illustrating the operations of blocks 502-508 of FIG. 5. Illustrated are the N data segments that together comprise the first backup data 602 (e.g. data segments A-E' and the L data segments that together comprise the second backup data 604 (e.g. data segments A-N, P, and R-E'). For simplicity, we assume that each of the data segments is represented by an independently addressable file.

Note that the second backup data lacks data segments O and Q, indicating that the files associated with segments O and Q have been deleted from the processing device 102 since the first backup data 602 was received. This may be due to a legitimate deletion of the files or due to a ransomware attack.

A signature each file of a subset of the N files (the indicated M files) is generated and stored for later comparison with the signature of the associated file received in the first backup data. For example, in the illustrated embodiment, a signature (e.g. hash) is generated for files D-V and stored for further use. When the second backup data 604 is received, a hash of each file in a subset of the L files is generated and compared to the hash of the corresponding file in the first backup data 602. For example, a hash of file H of the second backup data 604 is generated and compared to the stored hash of associated file H of the first backup data 602. This process is also performed for files I-N, P, and R-T of the second backup data 604, with the resulting signatures compared to the stored signatures for files I-N, P and R-T of the first backup data. In the illustrated embodiment, the signatures of files H, I, M, N, P, R, S, and T have not changed, while the signatures of files J, K and L have changed. Accordingly, of the N files in the first backup data, the signature of M of those files were compared to the signatures of J files of the L files received in the second backup data. Since seven of the J (10) files that are represented in the second backup data 604 are identical to those corresponding files in the first backup data 602. Ignoring files that are missing from the second backup data 604, this means that 30% of J files in the second backup data have changed from their status when presented in the first backup data. When such a threshold has been exceeded, the detection module 402 concludes that the second backup data comprises ransomware, and prevents overwriting of first backup data. This may be accomplished by (1) overwrite protecting first backup data (e.g. by setting a flag associated with each data segment preventing them from being erased or written over and/or (2) electromechanically isolate the storage device 404 from the processing device 102 to protect the stored first backup data.

In the foregoing example, a signature is generated for only a subset M of the N data segments of the first backup data 602 and for only a subset J of the L data segments in the second backup data 604. In other embodiments, a signature can be generated for every one of the N data segments of the first backup data 602 and compared to a corresponding signature generated for every one of the L data segments of the second backup data 604. It is also noteworthy that data segments that are present in the first backup data 602 but not present in the second backup data 604 can be counted as an anomaly indicating ransomware, or assumed to simply be files that were legitimately deleted. Further, the number or percentage of files missing from the second backup data 604 may be used as an indication of ransomware. For example, if a threshold 10% or more of the files in the first backup data are not present in the second backup data, this may cause the detection module 402 to flag the second backup data 604 as likely including ransomware. Similarly, if a threshold of 10% or more of the files in the second backup data are not present in the first backup data, the detection module 402 may flag the second backup data as including ransomware. These threshold numbers may vary according to the time period that has passed since the last backup, as one would expect more files to be deleted or added with the passage of time.

It is noted that the operations of block 208 of FIG. 2 (in which it is determined whether the L data segments of the second backup data comprise ransomware) may be determined before such second backup data 604 is stored in storage device 404 (e.g. as Copy(X+1) 406B), or after such second backup data 604 is stored in the storage device 404 in storage device 404 (also, as Copy(X+1) 406B). Importantly, however, the first backup data 602 is protected from overwriting or erasure until the assessment of the second backup data 604 is complete and determined to be free of ransomware. Accordingly, if the L data segments are to be stored in the storage device 404 before the assessment of block 208 is completed, the N data segments of the first backup data 602 are first protected (e.g. write protected or electromechanically isolated from other elements of the system 400 at least until the assessment is complete.

Although FIG. 6 depicts the data segments of the first backup data 602 to be consecutive, this need not be the case. Instead, the data segments selected for generating signatures and comparing those signatures with subsequent versions of the same data segments may be randomly generated, or generated according to file type, file use, or the number of times the file has been read over a period of time. For example, the M data segments for which a signature is generated from the first backup data 602 may comprise some or all of the executable files (*.exe) in the first backup data. Or, since executables may be easier to replace if the processing device 102 is infected with ransomware, executable files may be excluded from the M data segments, and only data files (e.g. *.jpg, *.wbk, or *.doc) be included.

The backup computer 401 illustrated in FIG. 4 can be implemented at the same installation facility as the processing device 102, or can be used to implement the cloud back up storage 106C illustrated in FIG. 1. In this embodiment, the N data segments are stored in a first cloud storage allocation, and the L data segments are received for storage in a second cloud storage allocation. The preventing of the overwriting of the stored N data segments comprises determining differences between common segments between the stored N data segments and the received L data segments and programmably inhibiting write access to the first cloud storage allocation based on the determined differences between common segments (e.g. segments purporting to represent the same data) between the stored N data segments and the received L data segments.

Thus, previous backup data is protected appropriate integrity checks before overwriting that space, and such integrity checks are automated so that user does not have to take any actions to insure continued access to his/her data. Before overwriting previously stored backup data, the signatures of the data segments are used to perform an integrity check. If the integrity check fails, overwriting the previously stored data segments is prevented until authorized by the user, for example after dual authentication to assure such overwriting is to be permitted.

Detection can be based on a system configurable threshold that compares sets of hashes from different files or sectors to the previously copied information. If a sufficient number of differences exist, previous copies of the information are locked down in a read only/write protected mode, allowing the user to restore from the protected copy as often as desired from a known good instance of the information.

Implementations may include multiple levels of security in which the electromechanical programmably irreversible isolation is used for higher levels of security, and programmably reversible isolation is used for lower levels of security. For example, in the system may operate by with programmable disconnection of the storage devices 306 after backup data is stored (essentially producing multiple copies of the backup data), with programmable reconnection of the firstly disconnected storage devices 306 once it is assured that no ransomware has been detected, thus eliminating the need for manual intervention.

Hardware Environment

Figure 7:
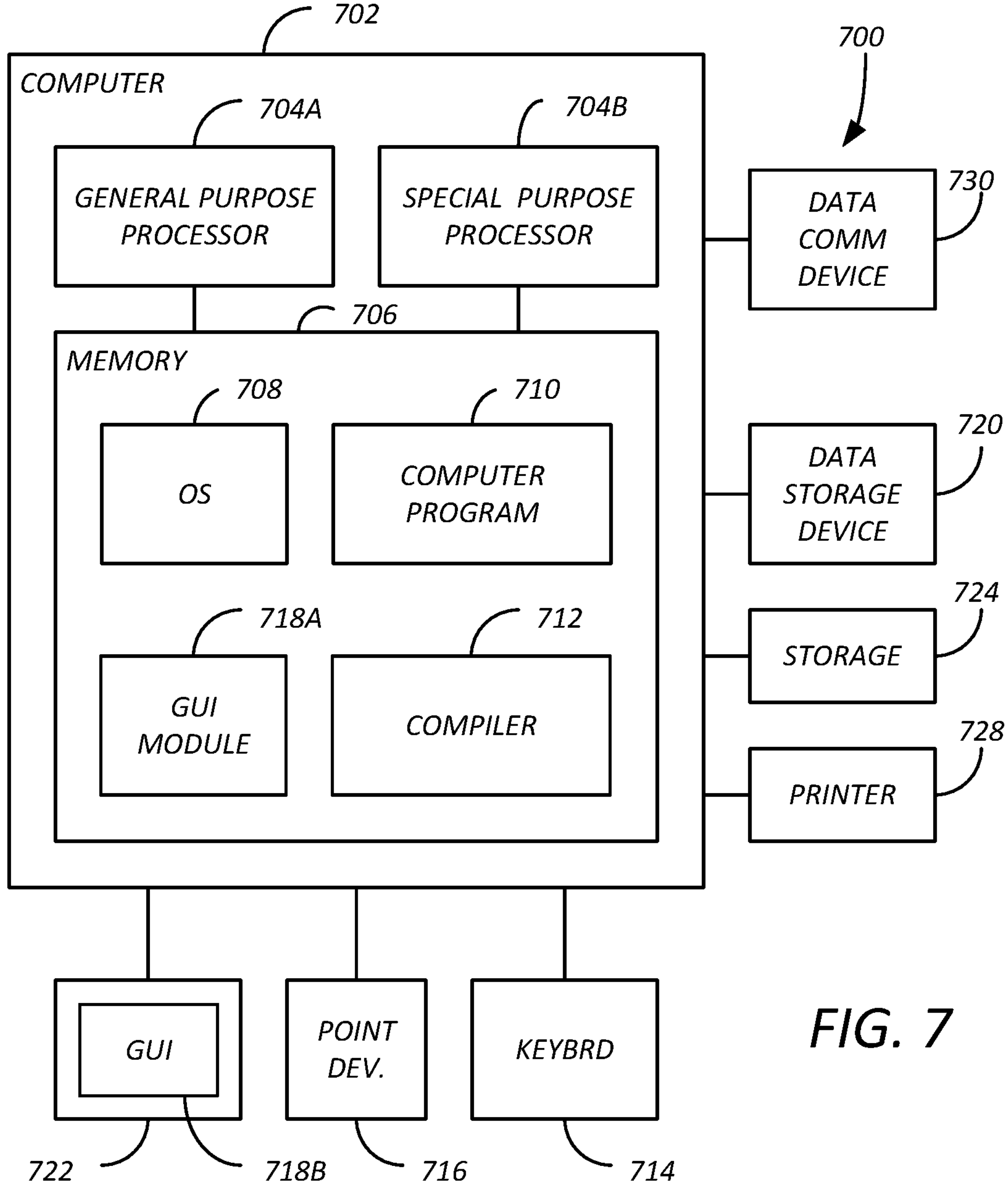
FIG. 7 illustrates an exemplary computer system that could be used to implement processing elements of the data backup system.

FIG. 7 illustrates an exemplary computer system 700 that could be used to implement processing elements of the above disclosure, including the processing device 102, modem 108, cloud based backup storage 106C, cloud based backup storage 106L, DBC 301, backup computer 401. The computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

Described above is a system and method for backing up data. In one embodiment, the method comprises receiving N data segments, the N of data segments together defining first backup data read from a processing device, receiving L data segments, the L data segments together defining second backup data read from the processing device temporally subsequent to the reading of the N data segments, determining if the L data segments comprise ransomware, preventing overwriting of the stored N data segments if the L data segments comprise ransomware, and storing the received L data segments if the L data segments do not comprise ransomware.

Implementations may include one or more of the following features:

Any of the methods described above, wherein: the method further includes: after receiving the N data segments: generating a signature for each one of M of the received data segments, wherein m<=n; storing the received N of data segments; associatively storing each generated signature of the M received data segments with the associated one of the M data segments; after receiving the L data segments: generating a signature for each one of J of the received data segments, wherein j<=1; and determining if the L data segments include ransomware includes: determining if the L data segments include ransomware from a comparison of the J signatures with the M signatures.

Any of the methods described above, wherein: generating a signature for each one of M of the received data segments, wherein m<=n includes: generating a hash of each one of the M of the received data segments; and generating a signature for each one of J of the received data segments, wherein j<=L includes: generating a hash of each one of the J received data segments.

Any of the methods described above, wherein: determining if the L data segments include ransomware from a comparison of the J signatures with the M signatures includes: determining a number of differences between the J signatures and the M signatures; and determining that the L data segments include ransomware according to the determined number of differences.

Any of the methods described above, wherein: preventing overwriting of the stored N data segments if the L data segments include ransomware includes. The method may also include write-protecting the stored N data segments.

Any of the methods described above, wherein: each of the N data segments and M data segments is a file.

Any of the methods described above, wherein: the M data segments are files of one or more selected types.

Any of the methods described above, wherein: wherein each data segment includes a sector of a hard drive.

Any of the methods described above, wherein: the N stored data segments storage are stored in cloud storage.

Any of the methods described above, wherein: M=N and J=L.

Any of the methods described above, wherein: the N data segments are stored in a first storage device; the L data segments are stored in a second storage device; and preventing overwriting of the stored N data segments includes communicatively isolating the first storage device before receiving the second backup data, the communicative isolation of the first storage device being programmably irreversible and manually reversible.

Any of the methods described above, wherein: the N data segments are stored in a first cloud storage allocation; the L data segments are received for storage in a second cloud storage allocation; and preventing overwriting of the stored N data segments includes: determining differences between common segments between the stored N data segments and the received L data segments; and programmably inhibiting write access to the first cloud storage allocation based on the determined differences between common segments between the stored N data segments and the received L data segments.

Another embodiment is evidenced by an apparatus, including: a processor and a memory, communicatively coupled to the processor, the memory storing processor instructions including processor instructions for performing the above identified operations.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of processing data on a device that includes a processor, comprising:

receiving N data segments, the N data segments together defining first backup data read from a processing device;

storing the received N data segments;

after receiving the N data segments, generating a signature for each one of M of the received data segments, wherein M<=N and associatively storing each generated signature of the M received data segments with the associated one of the M data segments;

receiving L data segments, the L data segments together defining second backup data read from the processing device temporally subsequent to the receiving of the N data segments;

after receiving the L data segments, generating a signature for each one of J of the received data segments, wherein J<=L;

determining if whether the L data segments comprise ransomware from a comparison of the J signatures with the M signatures by (i) determining a number of differences between the J signatures and the M signatures; and (ii) determining that the L data segments comprise ransomware according to the determined number of differences;

preventing overwriting of the stored N data segments if the L data segments comprise ransomware; and storing the received L data segments if the L data segments do not comprise ransomware.

2. The method of claim 1, wherein generating a signature for each one of M of the received data segments, wherein M<=N comprises:

generating a hash of each one of the M of the received data segments; and generating a signature for each one of J of the received data segments, wherein J<=L comprises:

generating a hash of each one of the J received data segments.

3. The method of claim 1, wherein preventing overwriting of the stored N data segments if the L data segments comprise ransomware comprises write-protecting the stored N data segments.

4. The method of claim 1, wherein:

each of the N data segments and M data segments is a file.

5. The method of claim 4, wherein:

the M data segments are files of one or more selected types.

6. The method of claim 1, wherein:

wherein each data segment comprises a sector of a hard drive.

7. The method of claim 1, wherein the N stored data segments storage are stored in cloud storage.

8. The method of claim 1, wherein M=N and J=L.

9. The method of claim 1, wherein:

the N data segments are stored in a first storage device;

the L data segments are stored in a second storage device; and preventing overwriting of the stored N data segments comprises communicatively isolating the first storage device before receiving the second backup data, the communicative isolation of the first storage device programmably irreversible and manually reversible.

10. The method of claim 1, wherein:

the N data segments are stored in a first cloud storage allocation;

the L data segments are received for storage in a second cloud storage allocation; and preventing overwriting of the stored N data segments comprises:

determining differences between common segments between the stored N data segments and the received L data segments; and programmably inhibiting write access to the first cloud storage allocation based on the determined differences between common segments between the stored N data segments and the received L data segments.

11. An apparatus, comprising:

a processor;

a memory, communicatively coupled to the processor, the memory storing processor instructions comprising processor instructions for:

receiving N data segments, the N data segments together defining first backup data read from a processing device;

storing the received N data segments;

after receiving the N data segments, generating a signature for each one of M of the received data segments, wherein M<=N and associatively storing each generated signature of the M received data segments with the associated one of the M data segments;

receiving L data segments, the L data segments together defining second backup data read from the processing device temporally subsequent to the receiving of the N data segments;

after receiving the L data segments, generating a signature for each one of J of the received data segments, wherein J<=L;

determining if whether the L data segments comprise ransomware from a comparison of the J signatures with the M signatures;

preventing overwriting of the stored N data segments if the L data segments comprise ransomware; and storing the received L data segments if the L data segments do not comprise ransomware' wherein:

the processor instructions for generating a signature for each one of M of the received data segments, wherein M<=N comprise processor instructions for generating a hash of each one of the M of the received data segments; and the processor instructions for generating a signature for each one of J of the received data segments, wherein J<=L comprise processor instructions for generating a hash of each one of the J received data segments.

12. The apparatus of claim 11, wherein the processor instruction for determining if the L data segments comprise ransomware from a comparison of the J signatures with the M signatures comprise processor instructions for:

determining a number of differences between the J signatures and the M signatures; and determining that the L data segments comprise ransomware according to the determined number of differences.

13. The apparatus of claim 11, wherein the processor instructions for preventing overwriting of the stored N data segments if the L data segments comprise ransomware comprise processor instructions for:

write-protecting the stored N data segments.

14. The apparatus of claim 11, wherein:

the N data segments are stored in a first cloud storage allocation;

the L data segments are received for storage in a second cloud storage allocation; and the processor instructions for preventing overwriting of the stored N data segments comprise processor instructions for:

determining differences between common segments between the stored N data segments and the received L data segments; and programmably inhibiting write access to the first cloud storage allocation based on the determined differences between common segments between the stored N data segments and the received L data segments.

* * * * *